UNITED STATES PATENT OFFICE 2,013,394

PURIFIED AMINO PHENOL AND PROCESS

Alexander V. Tolstoouhov, New York, N. Y., assignor to Ostro Research Laboratories, Inc., New York, N. Y., a corporation of New Jersey No Drawing. Application April 9, 1932,
Serial No. 604,359

13 Claims. (Cl. 260—130.5)

This invention relates to a method of preparing pure amino phenols. In the preparation of para-amino phenols quinones and quinone imines always occur and are apparently always present in the finished compounds. They have not been removed therefrom heretofore as their presence was not recognized or known; nor has it been known that these compounds impart to the para amino phenols their characteristic instability. Para amino phenols in general react very readily with quinones to form a red oil which has been found to be an indophenol-like compound. It is insoluble in an acid solution, but quite readily soluble in a basic solution, with a blue color. Para amino phenols also react with quinonimines to form meri-quinonimines which are soluble in acid solution with a blue color and in alkaline solution with a yellow color. In this form it is readily extractable from the alkaline solution with ether. However, I have found that if this compound is reduced for example by sodium sulphite its acid properties are greatly increased to such an extent that it is no longer extractable with ether at pH8.

It is known that quinones,

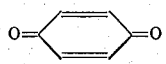

are produced by oxidation of phenols, including para amino phenols, and that quinones can be reduced to form compounds of the formula

The first stage of oxidation of para amino phenols results in quinonimines (sometimes called imoquinones),

The second stage of oxidation of para amino phenols produces quinones. Quinonimines or imoquinones unite with para amino phenols and form blue compounds called meri-quinonimines,

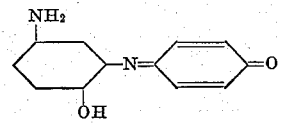

These compounds can be reduced to colorless leuco compounds:

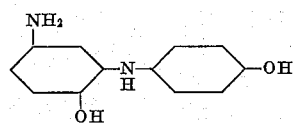

The acidic properties of reduced (colorless leuco) meri-quinonimines and the other reduced compounds are very much greater than those of amino phenol, thus enabling these impurities to be separated from the amino phenol.

The instability of amino phenols such as amino thymol is sometimes attributed to its property of being readily oxidized in the wet state. I have discovered that amino phenols in the absence of sunlight are fairly stable and are not readily oxidized providing there is no quinone or imoquinones present which might act as an oxidizing agent and providing that no strong alkali is present which would react on the amino phenol causing the formation of the quinonimine. Failures to prepare such a purified compound have been due to the fact that these reactions were not recognized or understood. When a reducing agent was previously used in the process, the impurities which were already present in the amino thymol were not removed and the formation of further impurities due to the presence of impurities formed in the process was not prevented. On the contrary, these impurities were merely converted by reduction into the colorless forms.

Quinones are insoluble in water whether acid or basic, but are readily soluble in almost all organic solvents, such as ether, benzene, chloroform, etc. The hydroquinones which are reduction products of the quinones are soluble in aqueous solutions and very soluble in basic solutions. They are soluble in organic solvents, but are so much more soluble than the quinones in basic aqueous solutions that they are not extracted therefrom by organic solvents. The complex red oil formed by quinones reacting on amino phenols are insoluble in acid and are soluble in organic solvents. These facts may be utilized in a process of producing purified para amino phenols, but traces of quinone, imoquinone and meri-quinonimines are still likely to remain with the amino phenols as impurities. Where it is necessary to prepare an absolute pure para amino phenol, and particularly amino thymol having no reducing agent present therein, the process mentioned is not always certain of success. I have discovered a method of overcoming the difficulties of this process in that I can remove the very last traces of all impurities such as quinones, imoquinones, and hydroquinones.

In accordance with the present invention, I may first prepare a purified amino phenol such as amino thymol as described in the application of Iwan Ostromislensky and Alexander V. Tolstoouhov, Serial No. 603,234, filed April 4th, 1932, by dissolving the impure amino phenol in a dilute acid solution with pH about 1.5 to 2.5, and removing any quinone, imoquinone and red oil present either by filtering or extracting with an organic solvent such as ether or chloroform, for example, and then precipitating amino thymol by alkalizing the solution to pH of about 8 in the presence of a reducing agent such as sodium sulphite. By so doing, all the quinone, imoquinone, quinhydrone and meri-quinonimine which may be present are converted and reduced to hydroquinone, amino thymol and leuco meri-quinonimine. These impurities are referred to in the claims as oxidation products. They are extremely soluble, whereas the amino thymol is quite insoluble in a solution of the above basicity. Instead of then filtering out the amino thymol, I extract the latter with an organic solvent, preferably ether, which does not dissolve hydroquinone, or leuco meri-quinonimine when the pH of the solution is about 8 and recover the purified amino thymol from the organic solvent by removing it. The solvent carries the amino thymol in solution. The amino thymol may be recrystallized from the solution by cooling or evaporating the organic solvent. The resulting product or residue is a snow white crystalline compound which in the absence of moisture remains white and has the advantage over material prepared by other processes of being absolutely free, not only of impurities such as the quinone and hydroquinones, but also of all reducing substances which have been found necessary to prevent decomposition of amino thymol that has not been completely purified.

*Example.*—Dissolve 165 grams of amino thymol prepared by any known method in 2000 cc. of water to which has been added 100 cc. of concentrated hydrochloric acid; extract with 500 cc. of ether, discarding the latter, and bring the solution to pH8 by the addition of about 600 cc. of 5% sodium sulphite solution, then extract the solution with 500 cc. of ether and recover purified amino thymol by recrystallizing. The resulting compound obtained from the impure substance heretofore prepared has a sharp melting point of 179–179.5° C.

Although the invention has been specifically described, in connection with the purification of amino thymol, it is to be understood that it is also applicable to amino phenols in general such as ortho- and para aminophenol, mono- and polyakyl and aryl derivatives and substitution products thereof, as well as halogen and other substitution products thereof.

When the amino thymol is purified in accordance with this invention and administered orally, it is eliminated almost completely in the urine in two to six hours in a form which is still actively bactericidal. On administration to patients suffering from infections of the urinary tract, particularly of the pelvis of the kidney and bladder, such as pyelitis and cystitis, there is in a few days a diminution in the number of colonies of bacteria which can be cultivated from the eliminated urine, whether the bacteria are of the gram positive or gram negative variety. This is a considerable improvement over any present known method of treatment of these diseases.

Modifications of the methods described above for purifying the amino thymol will occur to those skilled in the art by which substantially the same results can be accomplished. For example, the impure amino thymol may be dissolved in dilute acetic or sulfurous acid, the impurities filtered or extracted from the solution if necessary, and the solution then alkalized, after which the amino phenol is extracted with the organic solvent.

While in describing my method of obtaining a pure amino phenol, I have shown as an example amino thymol, nevertheless what has been said of the reactions, color changes, and solubilities are also true of the family of para amino phenols in general, and my invention is applicable to them. For example, para amino derivatives of carvacrol, xylenol, cresol, phenol, diethyl phenol, etc., all form the corresponding quinones, hydroquinones, quinhydrones and red oils under the same conditions and can be freed from these impurities in the same way.

Ether is the best organic solvent to use in this process. Chloroform and other organic solvents can be used but with less satisfactory results.

I claim:

1. The process of removing quinone, hydroquinone and red oil from an amino phenol, which comprises dissolving in an acid solution of about pH1.2 to about pH2.5 an amino phenol containing impurities resulting from oxidation of the amino phenol, extracting some of said impurities from the solution, alkalizing to about pH8 in the presence of a reducing agent, extracting with an organic solvent in which the amino phenol is soluble and hydroquinone is insoluble at a pH of about 8, and recovering the amino phenol from the solvent.

2. The process of obtaining a pure amino phenol, which comprises dissolving in an acid solution of about pH1.2 to about pH2.5 an amino phenol containing impurities resulting from oxidation of the amino phenol, extracting some of said impurities from the solution, alkalizing to about pH8 in the presence of a reducing agent, extracting with an organic solvent in which the amino phenol is soluble and hydroquinone is insoluble at a pH of about 8, and recovering the amino phenol from the solvent.

3. The process of obtaining a pure amino phenol, which comprises dissolving in an acid solution of about pH1.2 to about pH2.5 an amino phenol containing impurities resulting from oxidation of the amino phenol, extracting some of said insoluble impurities from the solution by filtering, alkalizing to about pH8 in the presence of a reducing agent, extracting with an organic solvent in which the amino phenol is soluble and hydroquinone is insoluble at a pH of about 8, and recovering the amino phenol from the solvent.

4. The process of obtaining a pure amino phenol, which comprises dissolving in a hydrochloric acid solution of about pH1.2 to about pH2.5 an amino phenol containing impurities resulting from oxidation of the amino phenol, extracting some of said impurities from the solution, alkalizing to about pH8 in the presence of a reducing agent, extracting with an organic solvent in which the amino phenol is soluble and hydroquinone is insoluble at a pH of about 8, and recovering the amino phenol from the solvent.

5. The process of obtaining a pure amino thymol, which comprises dissolving in an acid solution of about pH1.2 to about pH2.5 an amino thymol containing impurities resulting from oxidation of the amino thymol, extracting some of said impurities from the solution, alkalizing to about pH8 in the presence of a reducing agent, extracting with an organic solvent in which the amino thymol is soluble and thymo hydroquinone is insoluble at a pH of about 8, and recovering the amino thymol from the solvent.

6. The process of purifying an amino phenol, which comprises dissolving in an acid solution of about pH1.2 to about pH2.5 an amino phenol containing hydroquinone, extracting hydroquinone from the solution with an organic solvent, alkalizing the solution to about pH8 in the presence of a reducing agent, extracting with an organic solvent in which the amino phenol is soluble and hydroquinone is insoluble at a pH of about 8, and recovering the amino phenol from the solvent.

7. The process of obtaining a pure amino phenol, which comprises dissolving in an acid solution of about pH1.2 to about pH2.5 an amino phenol containing impurities resulting from oxidation of the amino phenol, extracting some of said impurities from the solution, alkalizing to about pH8 in the presence of a reducing agent, extracting with ether, and recovering the amino phenol from the solvent.

8. The process of removing quinone, hydroquinone and red oil from an amino phenol, which comprises dissolving in an acid solution of about pH1.2 to about pH2.5 an amino phenol containing impurities resulting from oxidation of the amino phenol, extracting some of said impurities from the solution, alkalizing to about pH8 in the presence of a reducing agent, extracting with ether, and recovering the amino phenol from the solvent.

9. The process of obtaining a pure amino phenol, which comprises dissolving in an acid solution of about pH1.2 to about pH2.5 an amino phenol containing impurities resulting from oxidation of the amino phenol, extracting some of said insoluble impurities from the solution by filtering, alkalizing to about pH8 in the presence of a reducing agent, extracting with ether, and recovering the amino phenol from the solvent.

10. The process of obtaining a pure amino phenol, which comprises dissolving in a hydrochloric acid solution of about pH1.2 to about pH2.5 an amino phenol containing impurities resulting from oxidation of the amino phenol, extracting some of said impurities from the solution, alkalizing to about pH8 in the presence of a reducing agent, extracting with ether, and recovering the amino phenol from the solvent.

11. The process of removing thymoquinone, thymohydroquinone and red oil from para amino thymol, which comprises dissolving in an acid solution of about pH1.2 to about pH2.5 para amino thymol containing impurities resulting from oxidation of the para amino thymol, extracting some of said impurities from the solution, alkalizing to about pH8 in the presence of a reducing agent, extracting with an organic solvent in which the para amino thymol is soluble and thymohydroquinone is insoluble at a pH of about 8, and recovering the para amino thymol from the solvent.

12. The process of purifying para amino thymol, which comprises dissolving in an acid solution of about pH1.2 to about pH2.5 para amino thymol containing thymohydroquinone, extracting thymohydroquinone from the solution with an organic solvent, alkalizing the solution to about pH8 in the presence of a reducing agent, extracting with an organic solvent in which the para amino thymol is soluble and thymohydroquinone is insoluble at a pH of about 8, and recovering the para amino thymol from the solvent.

13. The process of obtaining pure para amino thymol, which comprises dissolving in an acid solution of about pH1.2 to about pH2.5 para amino thymol containing impurities resulting from oxidation of the para amino thymol, extracting some of said impurities from the solution, alkalizing to about pH8 in the presence of a reducing agent, extracting with ether, and recovering the para amino thymol from the solvent.

ALEXANDER V. TOLSTOOUHOV.